United States Patent [19]
Mason

[11] Patent Number: 6,135,003
[45] Date of Patent: Oct. 24, 2000

[54] MACHINE FOR CUTTING FASTENERS TO DISASSEMBLE PALLETS

[76] Inventor: Gordon Edward Mason, 3 Kimmins Crt., Kanata ON, Canada, K2K 2M3

[21] Appl. No.: 08/925,165

[22] Filed: Sep. 8, 1997

Related U.S. Application Data

[63] Continuation-in-part of application No. 08/621,995, Mar. 26, 1996, abandoned.

[51] Int. Cl.[7] .................................................. B23D 53/00
[52] U.S. Cl. .............................. 83/788; 83/943; 29/564.3; 29/239; 29/426.4
[58] Field of Search .............................. 83/943, 788, 813, 83/809, 820, 810, 871, 874; 29/426.4, 564.3, 239

[56] References Cited

U.S. PATENT DOCUMENTS

| | | | |
|---|---|---|---|
| 1,482,711 | 2/1924 | Sorenson | 83/813 |
| 2,593,843 | 4/1952 | Cannon | 83/820 |
| 3,869,780 | 3/1975 | Ginnow et al. | 83/943 |
| 3,968,715 | 7/1976 | Cleland | 83/820 |
| 4,078,463 | 3/1978 | Leonard et al. | 83/939 |
| 4,152,819 | 5/1979 | Conkle | 29/252 |
| 4,320,570 | 3/1982 | Williams | 29/564.3 |
| 4,392,403 | 7/1983 | Martindale, Jr. | 29/426.4 |
| 4,435,892 | 3/1984 | Williams | 29/564.3 |
| 4,750,255 | 6/1988 | Hufnagel | 29/564.3 |
| 4,757,599 | 7/1988 | Bane | 29/564.3 |
| 4,878,411 | 11/1989 | Laskowski et al. | 83/820 |
| 5,201,110 | 4/1993 | Bane | 83/943 |

*Primary Examiner*—M. Rachuba
*Attorney, Agent, or Firm*—Robert G. Hendry

[57] ABSTRACT

A pallet dismantling machine for cutting nail staples or like fastening means holding boards to stringers or blocks of the pallet assembly to facilitate reuse of the wood or other material from which the pallets are manufactured. The machine includes a horizontally mounted band saw blade and a vertically convenient adjustable work table. The distance between the table and the saw blade is adjusted to be equal to the thickness of the board so that the blade passes between the board and the stringer to cut the nails or other fasteners.

6 Claims, 3 Drawing Sheets

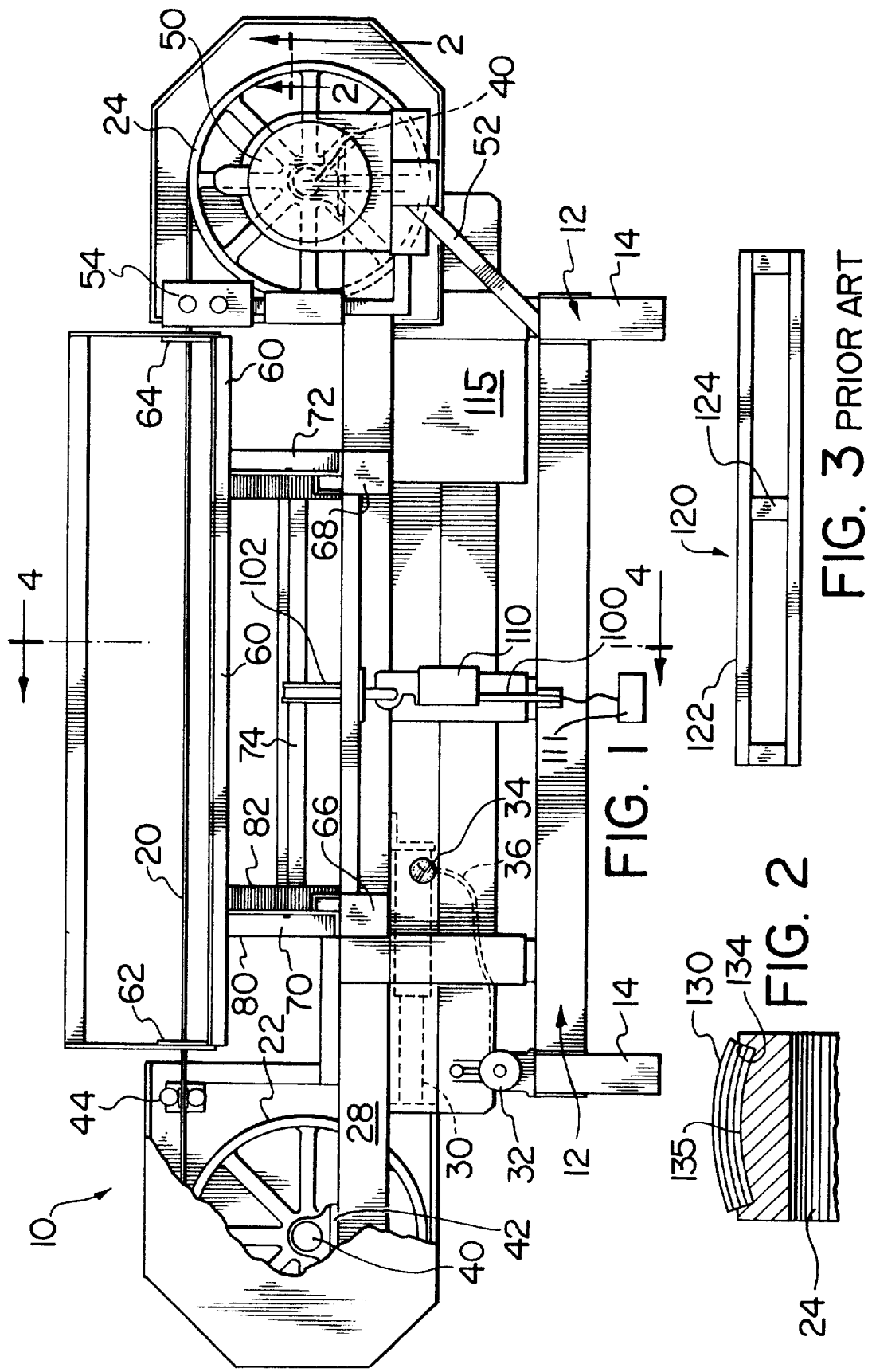

MACHINE FOR CUTTING FASTENERS TO DISASSEMBLE PALLETS

This application is a continuation-in-part of U.S. Ser. No. 08/621,995 filed Mar. 26, 1996 now abandoned.

DISCUSSION OF PRIOR PATENTS

Prior attempts to provide an economically feasible machine for disassembling pallets in a manner which would permit reuse of the boards and stringers included removing or loosening nails though the use of hydraulic presses or the like. This approach is expensive as each machine must be designed to suit a particular pallet configuration. Furthermore, damage to the boards and stringers is more likely to occur if the pallets are thumped prior to sawing in the manner disclosed in U.S. Pat. No. 5,201,110, and nail stubs remain and protrude from the boards.

Known horizontal band saws, of the single stage belt drive disclosed in U.S. Pat. No. 3,092,155, does not provide the necessary torque for low speed cutting of nails or fasteners used to secure the boards to the stringers. Furthermore, the prior band saws were not equipped with tables having accurate foot controlled means for vertical height adjustment.

The present invention seeks to overcome these disadvantages by the provision of a band saw to cut fastening means of the pallets in a manner requiring no prior loosening of the nails before cutting.

The pallet disassembling machine of this invention, also seeks to provide a work table which is quickly and accurately adjusted vertically so that the saw blade is in alignment with the joints between the boards and stringers.

A further advantage of the machine of the present invention is that various lengths and widths of pallet can be accommodated as well as other configurations such as block pallets.

Another advantage is the provision of tires on the wheels of the band saw to improve transfer of energy to the blade while operating at required speeds.

SUMMARY OF THE INVENTION

The present invention provides a machine for disassembling pallets by cutting fastening means used to secure boards of varying thickness to stringers of pallets, said machine comprising a frame, a horizontal blade, two wheels entrained by the blade, one of which is driven by drive means, a tight fitting resilient tire in a peripheral groove in each of the wheels, a table and means for vertically adjusting the table including first and second jack assemblies interconnected by at least one transverse member, each jack assembly having first and second levers pivotally connected together at mid portions of each lever; a first end of the first lever being pivotally connected to the table; a first end of the second lever being pivotally connected to the frame; a second end of the first lever being in rolling contact with the frame, a second end of the second lever being in rolling contact with an underside of the table; means for raising the jack assemblies including a pair of interconnected links; a first one of the links having a first end pivotally connected to the transverse bar; a second one of the links having a first end pivotally joined to the frame and a second end pivotally joined to the first link and spaced from a second end of the first link so that a portion of the first link extends beyond the second link and an electrical linear actuator for moving the links and the jack assemblies to vertically adjust the table so that a pallet on the table will be aligned with the saw blade thereby allowing the blade to pass between the boards and the stringers as pallets move across the table and the fastening means will be cut thereby disassembling the pallet.

BRIEF DESCRIPTION OF THE DRAWINGS

In the drawings, which illustrate a preferred embodiment of the invention:

FIG. 1 is a front elevational view of a pallet disassembling machine including a band saw and work table;

FIG. 2 is a fragmentary cross sectional view of one of the wheels of the band saw taken along the lines 2—2 of FIG. 1;

FIG. 3 is an end view of a typical pallet to be disassembled;

Figure 4:
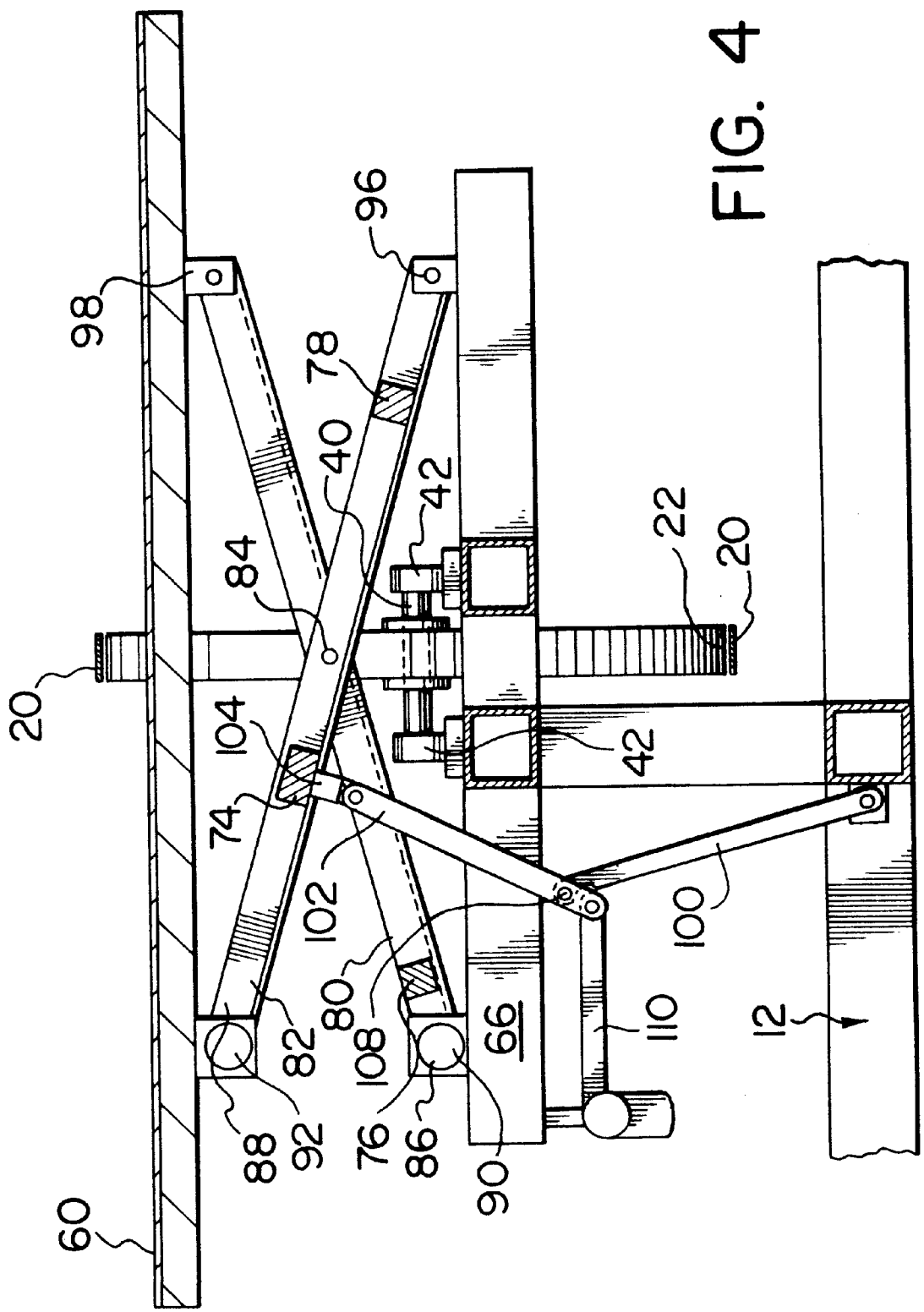
FIG. 4 is a fragmented side elevational view of the adjustable work table taken along the line 4—4 of FIG. 1.
Figure 5:
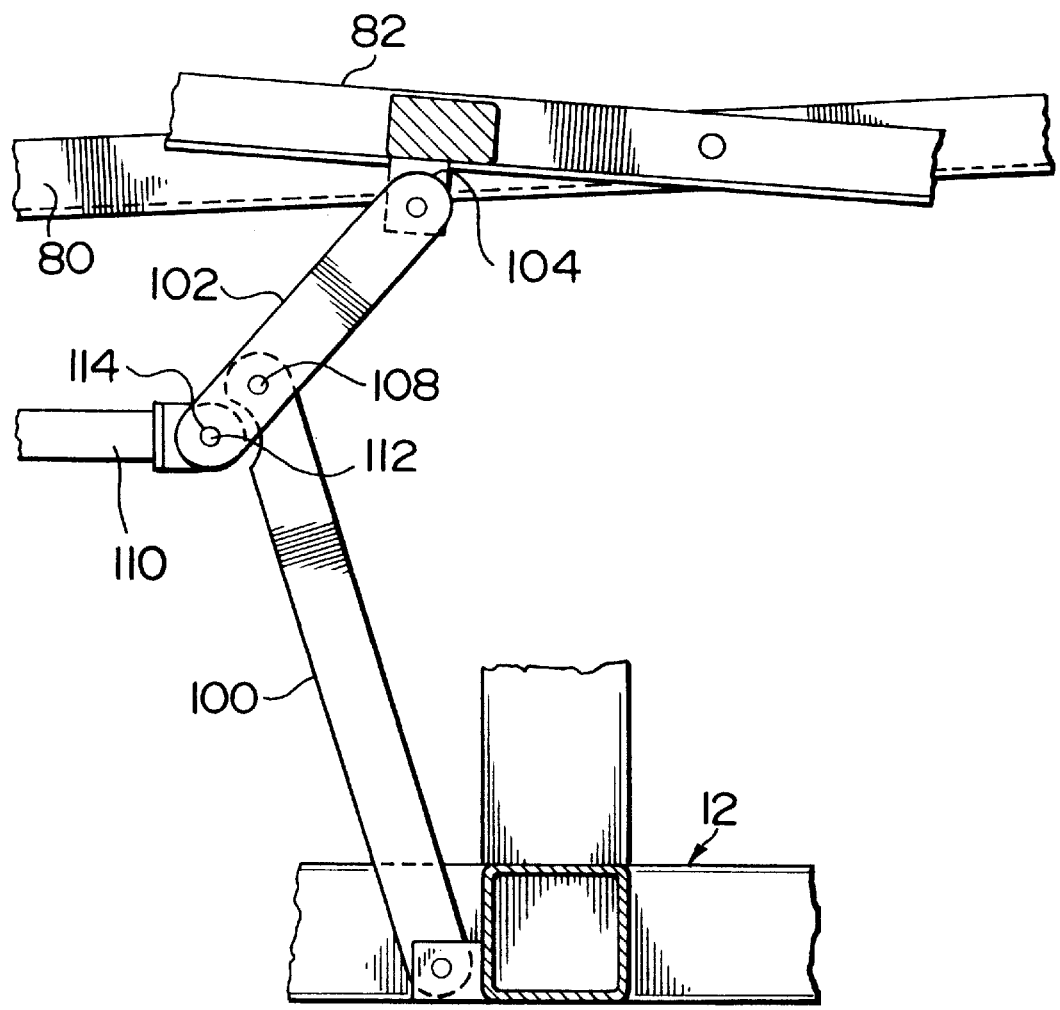
FIG. 5 is a fragmented view of the lift lever and actuator of the work table adjustment mechanism of FIG. 4.

Referring now in detail to the drawings, the pallet disassembling machine shown generally at 10 in FIG. 1 includes a frame 12 for supporting a saw. The frame 12 includes ground engaging legs 14.

The saw blade 20 extends around two wheels 22 and 24 mounted on the frame 12. The wheel 22 is mounted on a movable frame member 28 and a hydraulic piston cylinder assembly 30 moves the wheel 22 to provide tension on the blade 20 of approximately 1,025 lbs.

The piston cylinder assembly 30 is actuated by a hand-operated hydraulic pump 32. A hydraulic pressure gauge 34 is included in the line 36 between the pump 32 and the cylinder 30.

The wheels 22 and 24 have shafts 40 mounted for rotation on two bearings supported on pillow blocks 42. Two blade guides 44 (one of which is shown) are provided for the blade 20 adjacent the wheels 22 and 24.

The drive means for the wheel 24 is preferably an electric motor 50 adapted to drive the shaft 40 of the wheel 24 directly through a suitable gear box. Alternatively, a series of pulleys and belts can be provided in a conventional manner.

The frame 12 includes a wing 52 for supporting the electric motor 50 and the bearings on, pillow blocks 42, of the wheel 24. The required motor controls 54 are also mounted on the frame 12 adjacent the motor 50.

A work table 60 shown in more detail in FIG. 4 has a flat substantially rectangular surface and includes parallel side edge guides 62 and 64.

The table 60 is secured to a pair of frame members 66 and 68 on the frame 12 by a pair of lever assemblies 70 and 72 pivotally secured to the frame members 66 and 68 respectively which are in turn pivotally secured to the table. Transverse members 74,76 and 78 interconnect the assemblies 70 and 72. The assemblies 70 and 72 are substantially identical and therefore only one will be described with reference to FIG. 4.

The lift lever assembly 70 comprises two similar levers 80 and 82 pivotally connected adjacent their mid points such as by a bolt 84 or the like. The ends 86 and 88 of the levers 80 and 82 are provided with rollers 90 and 92 respectively. The rollers 90 and 92 are in rolling contact with channels 93 and 95 on the frame member 66 and the underside of the table 60 respectively. The other ends of the levers 80 and 82 are pivotally secured to brackets 96 and 98 on the table 60 and the frame member 66.

Lifting of the table 60 is accomplished by means including a pair of interconnected links 100 and 102, the upper link 102 is connected to a bracket 104 on the transverse member 74 and the lower end of the lower link 100 is pivotally connected to the frame 12. The adjacent ends of the links 100 and 102 are pivotally connected at 108 so that a portion of the lower end of the link 102 extends beyond the pivot point 108 and a linear actuator 110 acts on the portion of the link 102 extending beyond the pivot point 108. The actuator 110 is secured to the lower end of the link 102 by a suitable bolt 112 extending through an aperture 114. The actuator 110 changes rotary motion of a 24v DC electric motor to lateral motion and is conveniently controlled by a conventional foot-operated switch 111. The linear actuator 110 is a model no. PV2616R manufactured by Motion Systems Corp.

A conventional pallet, shown at 120 in FIG. 3, is fabricated of boards 122 secured to stringers 124 by fastening means such as nails screws or staples. Other material may be substituted for wood and other forms of wood such as particle board, plywood or laminates are included in the suitable materials.

In order to provide the frictional engagement between the blade 20 and the driven wheel 24, a resilient flat belt or tire 130 preferably of moulded synthetic rubber is installed in a convex annular groove 134 in the periphery of the wheel 24. The side walls of the groove 134 taper inwardly toward a convex bottom wall 135 of the groove 134.

The tire 130 has a substantially rectangular cross section. However, when the flat belt is in the groove 134 which has a convex bottom wall 135 this results in a tire 130 having a convex cross section. The convex shape is important to maintain the blade centered on the wheels 22 and 24.

The design of the wheels 22 and 24 facilitates maintaining blade traction under maximum load conditions. This is accomplished by providing the wheel with the convex shape. Rubber tires or belts glued to the wheel do not provide sufficient adhesive bonding when higher blade tensions are required at blade speeds suitable for cutting nails. The torque produced on the wheel 24 at the rated horsepower of the 5 horsepower motor 50 is about 250 to 350 lbs. while providing a cutting speed of the blade of 525 linear feet per minute. At this speed, nails and wood can be cut with negligible spark hazard in a wood working environment.

Cutting nails requires a fine tooth blade and low speed. However, when nails are surrounded by wood, gums can accumulate on the blade. A compromise must therefore, be made and a combination or variable tooth blade 20 has been chosen for use in the machine 10. The combination blade is resistant to heating and the speed is lowered to minimize the generation of sparks. A pallet feed rate of approximately 128 inches per minute can be maintained.

The work table is adjusted to match the thickness of the board so that the blade 20 will pass between the board 122 and the stringer 124. Vertical movement of the table 60 is carried out by energizing the actuator 110 through the use of the foot switch 111. The actuator 110 moves the links 100 and 102 to raise or lower the lever assemblies 70 and 72. Although a hand cranked screw type actuator can be used the hands free fast acting electrical linear actuator 110 is preferred.

A control circuit board 115 is provided, and connected electrically to the actuator 110 so that the actuator moves at a controlled rate. It will be appreciated that pressing the foot-switch 111 briefly results in a small incremental vertical adjustment of the table. Depressing the foot-switch 111 continuously will cause the actuator to accelerate to top speed in a preset time. A microprocessor having 2K programmable memory provides the memory function for the preset time and a pulse width modulated H-bridge driver circuit provides acceleration control of the actuator 110.

The links 100 and 102 are moved laterally by the actuator 110 to raise or lower the table 60. The link 102 raises the table 60 by raising or lowering the transverse member 74 and the assemblies 70 and 72 to which the transverse member 74 is attached.

The lever assemblies 70 and 72 support the table 60 while the actual lifting of the table is performed by straightening the angular relationship of the links 100 and 102 to increase the distance between the outer ends of the links 100 and 102 and move the transverse member 74 away from the frame 12 conversely decreasing the angular relationship between the links 100 and 102 decreases the distance between the outer of the links 100 and 102 and moves the transverse member 74 toward the frame 12.

In operation a pallet 120 is placed on the table 60 with the band saw motor 50 running. The table 60 is raised or lowered by pressing the foot-switch 111 to energize the actuator 110 to move the links 100 and 102 and raise the lever assemblies 70 and 72. The circuit control board 115 provides a controlled rate of movement of the actuator 110 to allow precise vertical adjustment of the pallet 110 with respect to the blade 20 which is controlled by the operator. When the pallet 120 is positioned so that the blade 20 will pass between the boards 122 and the stringers 124, the operator releases the foot switch and pushes the pallet 120 against the blade 20. The pallets 120 are frequently constructed of unplaned lumber so that the blade 20 can pass between the stringer 124 and boards 122 by removing a minimum of material from the rough surfaces. When the fastening means such as nails (not shown) are moved to contact the blade 20 the nail will be severed at the surfaces of the board 122 and the stringer 124 so that there are no projecting nails although the nails remain in the wood.

What is claimed is:

1. A machine for disassembling pallets by cutting fastening means used to secure boards of varying thickness to stringers of pallets, said machine comprising: a horizontal blade, two wheels entrained by the blade, one of which is driven by drive means, a tight fitting resilient flat belt in a peripheral groove in each of the wheels, a frame, a table and means for vertically adjusting the table including first and second jack assemblies interconnected by at least one transverse member, each jack assembly having first and second levers pivotally connected together at mid portions of each lever; a first end of the first lever being pivotally connected to the table; a first end of the second lever being pivotally connected to the frame; a second end of the first lever being in rolling contact with the frame, a second end of the second lever being in rolling contact with an underside of the table; means for raising the jack assemblies including a pair of interconnected links; a first one of the links having a first end pivotally connected to the transverse bar; a second one of the links having a first end pivotally joined to the frame and a second end pivotally joined to the first link and spaced from a second end of the first link so that a portion of the first link extends beyond the second link and an electrical linear actuator for moving the links and the jack assemblies to vertically adjust the table so that a pallet on the table will be aligned with the saw blade thereby allowing the blade to pass between the boards and the stringers as pallets moved across the table by an operator and the fastening means will be cut thereby disassembling the pallet.

2. A machine as claimed in claim 1 wherein the blade is a variable tooth blade for cutting fastening means surrounded by wood.

3. A machine as claimed in claim 1 wherein the groove in each of the wheels has inwardly tapered side walls, and a convex bottom wall giving the flat belt a convex outer face.

4. A machine as claimed in claim 1 wherein the drive means drives the blade at a surface speed of about 525 ft. per minute with a force on the flat belts of from about 250 to about 350 lbs.

5. A machine as claimed in claim 1 wherein the electrical linear actuator is operated by a foot switch and a control circuit board for moving the actuator in two directions at a controlled rate for moving the interconnected links inwardly and outwardly to move the jack assemblies thereby raising or lowering the table.

6. A machine as claimed in claim 1 wherein a channel is provided on the frame to guide a roller provided on the second end of each of the first and second levers.

* * * * *